Patented Jan. 22, 1946

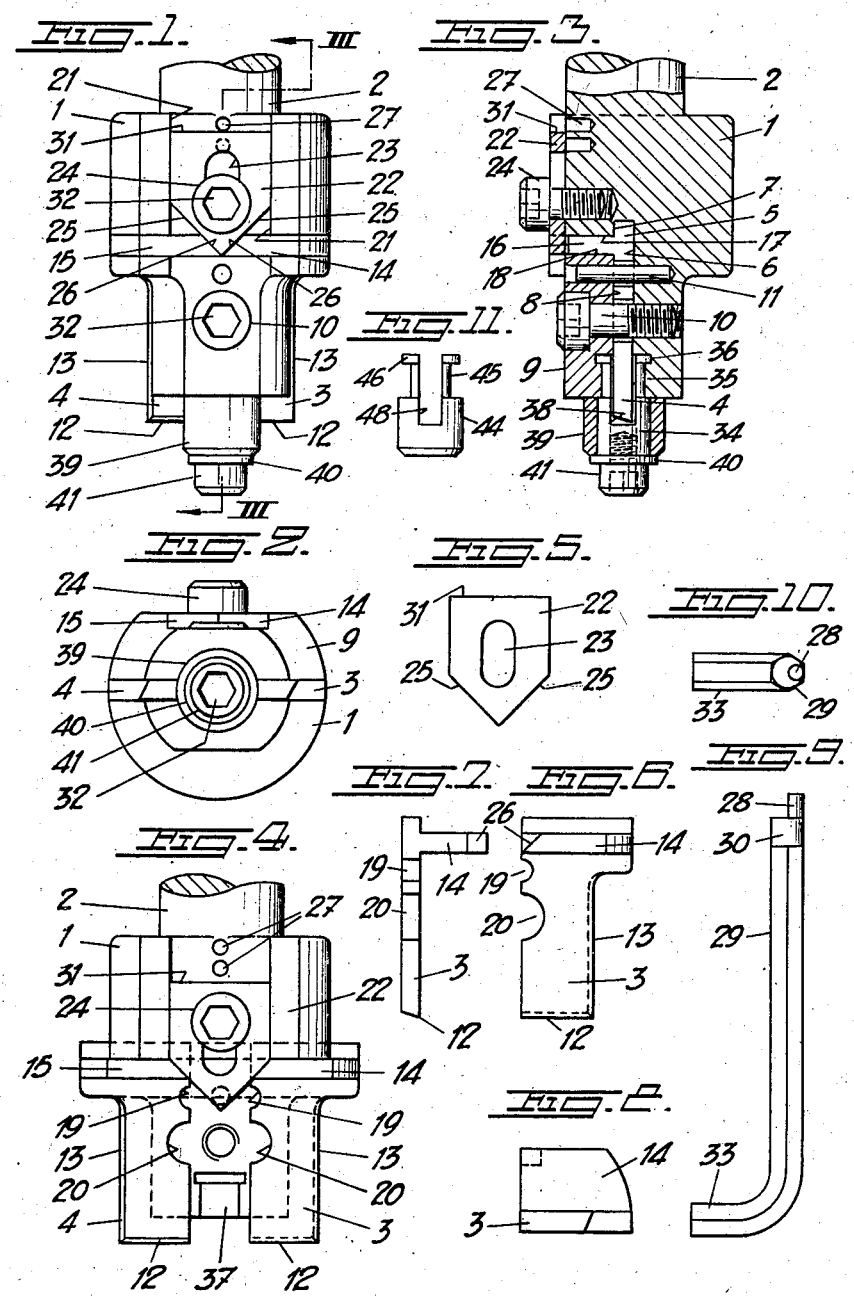

2,393,361

UNITED STATES PATENT OFFICE 2,393,361

PIN DRILL AND END MILL

Ernst Gustav Axel Flodman, Stocksund, Sweden

Application April 16, 1945, Serial No. 588,447
In Sweden August 18, 1942

7 Claims. (Cl. 77—58)

The present invention relates to adjustable counterbores or pin drills, as well as end mills, of the kind which are provided with two cutter tools which are slidably guided in the head or body of the pin drill in such manner that said cutter tools may be displaced radially outwards in a plane diametral to the axis of the said body, and may thus be adjusted in any desired positions, by means of a wedge cooperating with said cutter tools.

It is an object of the present invention to provide an improved simplified and strong construction of a pin drill or end mill of this type, in which the cutter tools shall be easily and yet accurately adjustable to any desired working diameter within a large range of diameters. It is also an object of the present invention to provide a construction in which the cutter tools are of a simple and comparatively inexpensive construction, and in which a change of cutter tools may be effected easily and conveniently. A further object of the invention is to provide a pin drill having a detachable pilot or guide pin which is rigidly held to the body of the pin drill when in use, but which may easily be removed entirely so that the pin drill may be used as an end mill, or may be replaced by another pilot having a different external diameter so as to render the pin drill adjustable to suit various dimensions of the hole into which the said pilot is to be inserted.

An important feature of the present invention is that the cutter tools are provided with flanges which extend laterally from the cutter tools, that is to say, in a direction transverse to the axis of the head or body of the pin drill, to the exterior of said body, and which flanges cooperate with the wedge which is slidable in a channel or keyway provided in the exterior surface of said body and extending in a direction parallel to the axis thereof. This construction provides for an easy and convenient adjustment of the cutter tools.

Other features of the invention will be readily apparent from the following description of a preferred constructional form of an adjustable counterbore or pin drill incorporating the features of this invention, and which is illustrated by way of example in the accompanying drawing.

In the drawing, Fig. 1 shows an elevation of the pin drill, and Fig. 2 shows an end view of the same, while Fig. 3 shows a section of the pin drill on the line III—III in Fig. 1. Fig. 4 shows a side view of the pin drill, similar to Fig. 1, but with the cutter tools in expanded positions, and with certain parts removed. Fig. 5 shows an elevation of the wedge. Figs. 6, 7 and 8 show a cutter tool viewed in elevation, side view and end view, respectively. Figs. 9 and 10 show a side view and an end view of a key used for adjustment of the pin drill. Fig. 11 shows a modified construction of the pilot of the pin drill.

The counterbore or pin drill illustrated in the drawing is provided with a head or body 1 having a shank 2 by means of which the pin drill may be inserted and clamped in a chuck of a turning lathe, a drill press, a milling machine, or the like. Two cutter tools 3 and 4 are provided in the body 1 and are guided therein in a channel or guideway 5 formed between a guide surface 6 on the body 1 parallel to the axis thereof, on the one hand, and on the other, an opposed guide surface 7 on the body 1 and a surface 8 on a cover plate or clamp piece 9, both of which surfaces 7 and 8 are also parallel to the axis of the body 1. The cover plate 9 is retained in position bearing against the cutter tools 3 and 4 and forcing them against the guide surface 6 by a screw 10 which is screw-threaded into the body 1. The cover plate 9 is also held in position by a dowel pin 11 which is inserted in the body 1 and the outer end of which fits into a corresponding hole in the cover plate.

Each cutter tool 3 and 4 has a radial cutting edge 12 at its lower end and a longitudinal cutting edge 13 at its outer side. Each cutter tool 3 and 4 is also provided with a flange 14 and 15, respectively, which projects laterally and at right angles from the cutter tool at a distance from the inner or upper end of the cutter tool, as illustrated in Figs. 3, 6, 7 and 8. Said flanges 14 and 15 are guided in a channel or guideway 16 formed between a guide surface 17 on the body 1 perpendicular to the axis thereof and a similar opposed guide surface 18 on the cover plate 9, also perpendicular to the axis of the body 1. In this way the said cutter tools 3 and 4 are efficiently guided in the body assembly of the pin drill, so that they may be projected or slid outwards from the axis of the drill or retracted within the body thereof. In the most retracted position of the said cutter tools 3 and 4, which is illustrated in Fig. 1, the inner edges of the cutter tools abut, and for this reason each cutter tool is provided in its said inner edge with semi-circular recesses 19 and 20, Fig. 6, to provide clearance for the dowel pin 11 and for the screw 10.

The body 1 is provided with an outside groove or keyway 21 which extends in the axial direction of the said body and which forms a guide for a wedge 22 which is slidable therein in the axial direction of the tool. The said wedge 22 is provided with a slot 23 which is traversed by a screw 24 which is screw-threaded into the body 1, and the head of which bears against the outer surface of said wedge 22 and serves to clamp the wedge against the body 1 and to secure it in position. The wedge 22 is provided with two inclined wedge surfaces 25 which form equal angles to the axial direction of the wedge which is also the line of motion of the wedge in the keyway 21. The said wedge surfaces 25 cooperate with the flanges 14 and 15 on the cutter tools 3 and 4, respectively, and for this purpose the said flanges 14 and 15 are provided with bevelled surfaces 26 having the same inclination to the axis of the tool as the said wedge surfaces 25 on the wedge 22.

It will be understood, therefore, that if the wedge 22 is displaced downwards from the position shown in Fig. 1, such movement of the wedge will cause the flanges 14 and 15 and thus also the cutter tools 3 and 4 to be displaced radially outwards due to the wedge surfaces 25 cooperating with the inclined surfaces 26 on the said flanges 14 and 15. In order to allow such outward movement of the cutter tools 3 and 4, it is of course necessary first slightly to unscrew the screw 10 to relieve the clamping pressure of the cover plate 9 on the said cutter tools 3 and 4 sufficiently to allow the said tools 3 and 4 to slide between the cover plate 9 and the body 1, and it is also necessary slightly to unscrew the screw 24 to relieve the pressure thereof on the wedge 22.

In order to provide for an easy and convenient adjustment of the wedge 22 there are provided a number of holes 27 in the body 1, said holes being adapted to receive an eccentric pin 28 at one end of a key 29, which is illustrated in Figs. 9 and 10. The key 29 is provided with a cylindrical portion 30 adjacent the eccentric pin 28, while the shaft of the key may have a polygonal and preferably hexagonal cross section. When the eccentric pin 28 is inserted in one of the holes 27, the key may be turned about said pin as a pivot whereby the circumference of the cylindrical portion 30 will cooperate with the end surface 31 of the wedge 22 so as to displace the latter in a downward direction, as viewed in Fig. 1, such downward movement of the wedge 22 resulting in the cutter tools 3 and 4 being separated and moved radially outwards from one another, as already stated. In this way, therefore, the pin drill may be easily and conveniently adjusted for various diameters. After such adjustment has been made, the screws 10 and 24 are of course pulled tight again, so as to retain the cutter tools 3 and 4, and the wedge 22, respectively, in their adjusted positions.

The heads of the screws 10 and 24 may suitably be provided with hexagonal recesses 32 adapted to receive the bent end 33 of the key 29, whereby the said screws may easily and conveniently be loosened and pulled tight by the aid of the said key 29.

In the constructional form illustrated in Figs. 1 to 4 inclusive the pilot or guide pin 34 of the pin drill is formed as a separate member and is provided with a neck 35 having a smaller diameter, and a collar 36 at the inner end thereof. The body 1 is provided with a recess 37, Fig. 4, of a corresponding shape, and the cover plate 9 is also provided with a similar recess, said recesses serving to receive the said neck 35 and collar 36 of the pilot, so that in this way the latter may be retained in position between the said body 1 and cover plate 9. As shown in Fig. 3, the pilot 34 is provided with a diametral slot 38 of sufficient depth in the axial direction to receive and provide clearance for the cutter tools 3 and 4. The protruding portion of the pilot 34 is surrounded by a ring 39 which is held in position by a washer 40 and a screw 41 which is screwed into a central hole in the end of the pilot 34, and the head of which may be provided with a hexagonal recess 32 to receive the end 33 of the key 29, as above explained in connection with the screws 10 and 24. The said ring 39 provides the actual guide surface of the pilot. The pin drill is preferably provided with a plurality of interchangeable rings 39 having the same inner diameter adapted to fit the protruding portion of the pilot 34, but having different outside diameters. By selecting a ring having the proper outside diameter the pin drill is easily adjusted to suit the diameter of the hole into which the pilot is to be inserted. By removing the pilot 34 and the ring 39, the pin drill may be used as an end mill, as will be easily understood.

Fig. 11 shows a slightly different construction of a pilot or guide pin 44. Also in this case the pilot is provided with a neck 45 of a smaller diameter and with a collar 46 similar to the neck 35 and collar 36 illustrated in Fig. 3, and with a slot 48 similar to the slot 38. In this case no surrounding ring is used on the protruding portion of the pilot, which is itself adapted to serve as a guide for the pin drill. In this case the pin drill will be supplied with a plurality of such pilots 44 having different outside diameters of the protruding portion of the pilot, and which are interchangeable, so that a pilot having the proper diameter may be selected and inserted between the body 1 and the cover plate 9.

I claim:

1. In a tool of the character described, the combination of a body, cutter tools slidable and adjustable in the diametral direction in said body, said cutter tools having flanges projecting therefrom in the transverse direction of said body to the exterior surface of said body, said body having a groove or keyway in its exterior surface extending in a direction parallel to the axis of said body, a wedge slidable in said keyway and provided with faces equally inclined to the longitudinal direction of said wedge, said wedge being adapted to cooperate with said flanges on said cutter tools so as thereby to displace said flanges and cutter tools away from one another in the diametral direction of said body, means for securing said cutter tools in adjusted positions, and means for securing said wedge in adjusted position.

2. In a tool of the character described, the combination of a body, a shank secured to said body and serving to secure the same in a chuck, said body having a plane guide surface substantially parallel to the axis of said body and said shank, said body having a plane guide surface substantially perpendicular to the axis thereof, a cover plate having two guide surfaces substantially perpendicular to one another, means for attaching said cover plate to said body in such position that said surfaces on said cover plate form together with said guide surfaces on said body a substantially L-shaped channel or guideway in such assembly of said body and said cover plate, one portion of said guideway being located substantially axially and diametrically in said assembly, and the other portion of said guideway extending in a transverse direction to the axis of such body to the exterior thereof, two cutter tools positioned in said guideway so as to be slideable and adjustable therein in a diametral direction relatively to the axis of said body, each of said cutter tools having a body portion located in the axially directed portion of said guideway and a flange extending substantially perpendicular to such body portion and located in the transverse portion of such guideway, said flanges on said cutter tools extending to the exterior of said body, said body having a groove or keyway in its exterior surface extending in a direction parallel to the axis of said body, a wedge slidably guided in said keyway so as to be movable in a direction parallel to the axis of said body, said wedge having two faces equally inclined in opposite directions to the line of motion of said wedge in said groove, said inclined surfaces being adapted to cooperate with said flanges on said cutter tools so as thereby to displace said flanges and said cutter tools away from one another in the diametral direction of said body, and means for securing said wedge in adjusted position relatively to said body.

3. In a tool of the character described, the combination of a body, a shank secured to said body and serving to secure the same in a chuck, said body having a plane guide surface substantially parallel to the axis of said body and said shank, said body having a plane guide surface substantially perpendicular to the axis thereof, a cover plate having two guide surfaces substantially perpendicular to one another, means for attaching said cover plate to said body in such position that said surfaces on said cover plate form together with said guide surfaces on said body a substantially L-shaped channel or guideway in such assembly of said body and said cover plate, one portion of said guideway being located substantially axially and diametrically in said assembly, and the other portion of said guideway extending in a transverse direction to the axis of such body to the exterior thereof, said means comprising a screw passing through a hole in said cover plate and screw-threaded into said body, a dowel pin secured to said body and passing through a hole in said cover plate, two cutter tools positioned in said guideway so as to be slideable and adjustable therein in a diametral direction relatively to the axis of said body, each of said cutter tools having a body portion located in the axially directed portion of said guideway and a flange extending substantially perpendicular to such body portion and located in the transverse portion of such guideway, said flanges on said cutter tools extending to the exterior of said body, said body having a groove or keyway in its exterior surface extending in a direction parallel to the axis of said body, a wedge slidably guided in said keyway so as to be movable in a direction parallel to the axis of said body, said wedge having two faces equally inclined in opposite directions to the line of motion of said wedge in said groove, said inclined surfaces being adapted to cooperate with said flanges on said cutter tools so as thereby to displace said flanges and said cutter tools away from one another in the diametral direction of said body, said wedge having an elongated through slot extending in the longitudinal direction of said wedge, and a screw passing through said slot in said wedge and screw-threaded into said body and having a head adapted to bear against the outer surface of said wedge so as thereby to secure said wedge in adjusted position.

4. In a tool of the character described, the combination of a body, a cover plate, cutter tools slidable and adjustable in the diametral direction between said body and said cover plate, said cutter tools having flanges projecting therefrom in the transverse direction of said body to the exterior surface of said body, said body having a groove or keyway in its exterior surface extending in a direction parallel to the axis of said body, a wedge slidable in said keyway and provided with faces equally inclined to the longitudinal direction of said wedge, said wedge being adapted to cooperate with said flanges on said cutter tools so as thereby to displace said flanges and cutter tools away from one another in the diametral direction of said body, means for securing said wedge in adjusted position, means for attaching said cover plate to said body, and a pilot, said pilot having a collar at one end thereof, said body and said cover plate having recesses adapted to receive said end of said pilot and said collar thereon, said pilot having a slot adapted to accommodate said cutter tools.

5. In a tool of the character described, the combination of a body, a shank secured to said body and serving to secure the same in a chuck, said body having a plane guide surface substantially parallel to the axis of said body and said shank, said body having a plane guide surface substantially perpendicular to the axis thereof, a cover plate having two guide surfaces substantially perpendicular to one another, means for attaching said cover plate to said body in such position that said surfaces on said cover plate form together with said guide surfaces on said body a substantially L-shaped channel or guideway in such assembly of said body and said cover plate, one portion of said guideway being located substantially axially and diametrically in said assembly, and the other portion of said guideway extending in a transverse direction to the axis of such body to the exterior thereof, two cutter tools positioned in said guideway so as to be slidable and adjustable therein in a diametral direction relatively to the axis of said body, each of said cutter tools having a body portion located in the axially directed portion of said guideway and a flange extending substantially perpendicular to such body portion and located in the transverse portion of such guideway, said flanges on said cutter tools extending to the exterior of said body, said body having a groove or keyway in its exterior surface extending in a direction parallel to the axis of said body, a wedge slidable in said keyway and provided with faces equally inclined to the longitudinal direction of said wedge, said wedge being adapted to cooperate with said flanges on said cutter tools so as thereby to displace said flanges and cutter tools away from one another in the diametral direction of said body, means for securing said wedge in adjusted position, and a pilot, said pilot having a neck of a smaller diameter and a collar at the end of said neck, said body and said cover plate having recesses adapted to receive said neck portion and said collar on said pilot, said pilot having a slot adapted to accommodate said cutter tools.

6. In a tool of the character described, the combination of a body, a shank secured to said body and serving to secure the same in a chuck, said body having a plane guide surface substantially parallel to the axis of said body and said shank, said body having a plane guide surface substantially perpendicular to the axis thereof, a cover plate having two guide surfaces substantially perpendicular to one another, means for attaching said cover plate to said body in such position that said surfaces on said cover plate form together with said guide surfaces on said body a substantially L-shaped channel or guideway in such assembly of said body and said cover plate, one portion of said guideway being located substantially axially and diametrically in said assembly, and the other portion of said guideway extending in a transverse direction to the axis of such body to the exterior thereof, two cutter tools positioned in said guideway so as to be slidable and adjustable therein in a diametral direction relatively to the axis of said body, each of said cutter tools having a body portion located in the axially directed portion of said guideway and a flange extending substantially perpendicular to such body portion and located in the transverse portion of such guideway, said flanges on said cutter tools extending to the exterior of said body, said body having a groove or keyway in its exterior surface extending in a direction parallel to the axis of said body, a wedge slidable in said keyway and provided with faces equally inclined to the longitudinal direction of said wedge, said wedge being adapted to cooperate with said flanges on said cutter tools so as thereby to displace said flanges and cutter tools away from one another in the diametral direction of said body, means for securing said wedge in adjusted position, a pilot, said pilot having a neck of a smaller diameter and a collar at the end of said neck, said body and said cover plate having recesses adapted to receive said neck portion and said collar on said pilot, said pilot having a slot adapted to accommodate said cutter tools, a ring surrounding said pilot, a retaining washer for said ring, and a screw screw-threaded into the end of said pilot to secure said washer thereto.

7. A tool as claimed in claim 1, in which the body is provided with holes in the keyway for the wedge, said holes serving to receive an eccentric pin at the end of a key provided with a cylindrical portion adapted to cooperate with the end of said wedge.

ERNST GUSTAV AXEL FLODMAN.